No. 611,957. Patented Oct. 4, 1898.
J. M. DAY.
THILL OR TONGUE COUPLING FOR VEHICLES.
(Application filed Dec. 6, 1897.)
(No Model.) 2 Sheets—Sheet 1.
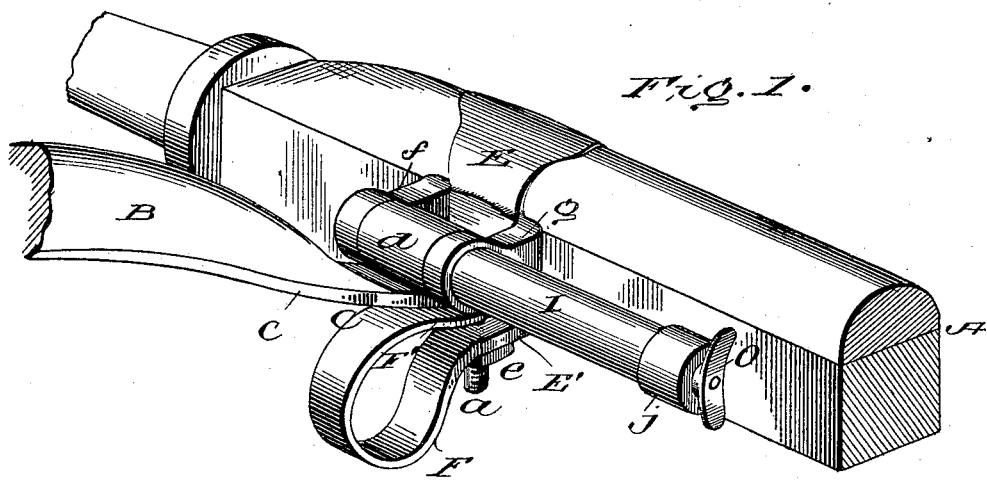
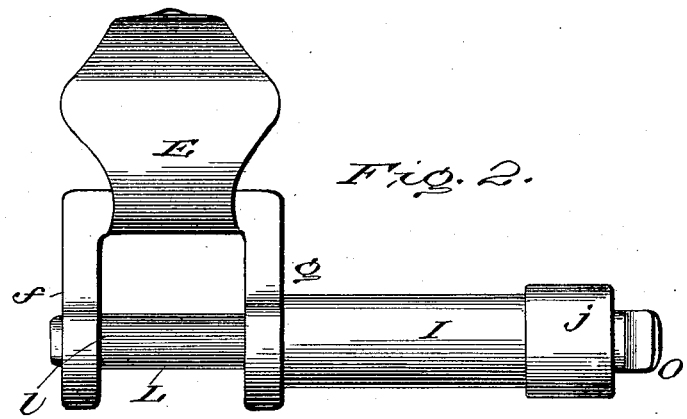
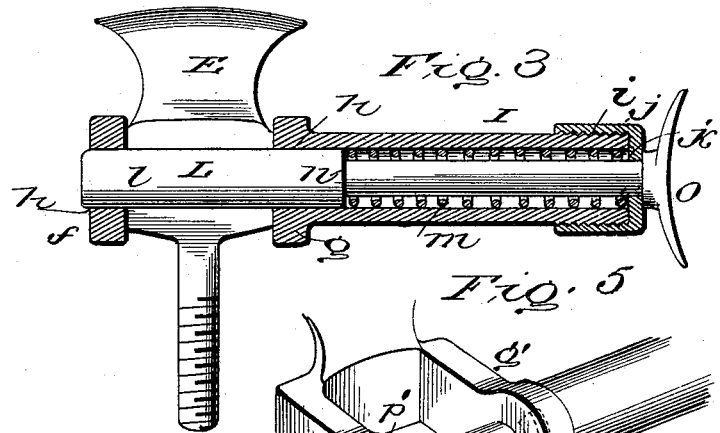
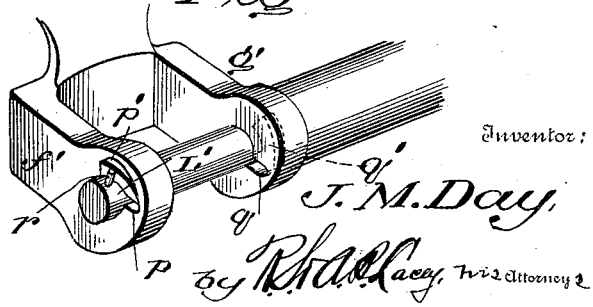
Witnesses
Inventor:
J. M. Day No. 611,957. Patented Oct. 4, 1898.
J. M. DAY.
THILL OR TONGUE COUPLING FOR VEHICLES.
(Application filed Dec. 6, 1897.)
(No Model.) 2 Sheets—Sheet 2.
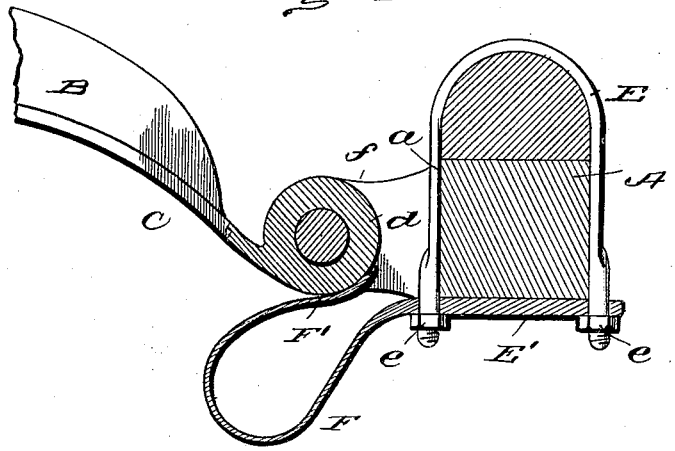
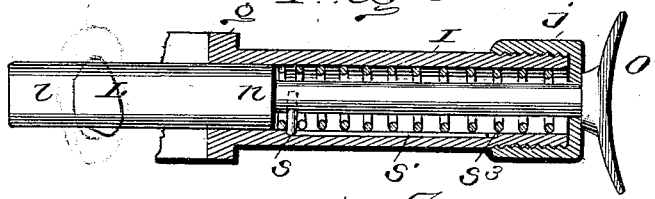
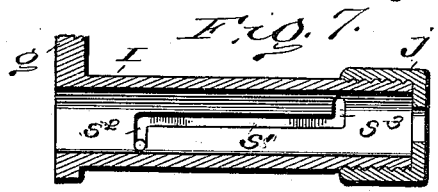
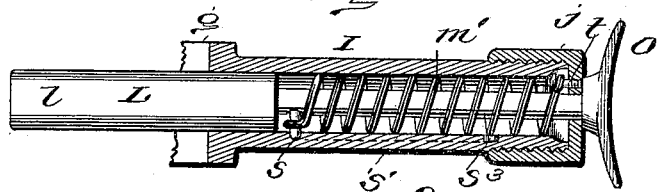
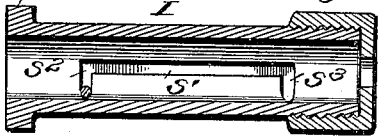
Witnesses Inventor
J. M. Day
by Lacey, his Attorneys

UNITED STATES PATENT OFFICE.

JOHN M. DAY, OF AURORA, NEBRASKA.

THILL OR TONGUE COUPLING FOR VEHICLES.

SPECIFICATION forming part of Letters Patent No. 611,957, dated October 4, 1898.

Application filed December 6, 1897. Serial No. 660,865. (No model.)

*To all whom it may concern:*

Be it known that I, JOHN M. DAY, a citizen of the United States, residing at Aurora, in the county of Hamilton and State of Nebraska, have invented certain new and useful Improvements in Thill or Tongue Couplings for Vehicles; and I do hereby declare the following to be a full, clear, and exact description of the invention, such as will enable others skilled in the art to which it appertains to make and use the same.

My invention relates to improvements in thill or tongue couplings for vehicles, the object being to provide a simple and effective coupling device by which the substitution of a tongue for the thills, and vice versa, may be readily and quickly accomplished and rattling of the parts prevented.

The detailed objects and advantages of the invention will appear in the course of the subjoined description.

In the accompanying drawings, hereto annexed and forming part of this specification, Figure 1 is a perspective view of a portion of a fore axle and shaft and my improved coupling. Fig. 2 is a top plan view of the coupling detached. Fig. 3 is a longitudinal sectional view of same. Fig. 4 is a cross-section of the parts shown in Fig. 1. Fig. 5 is a perspective view illustrating a modification. Figs. 6 to 9 are sectional views illustrating further modifications.

Referring now more particularly to the said drawings, A represents a fore axle, and B a thill or shaft provided with the connecting-iron C, having the eye $d$.

The improved coupling consists of a U-shaped clip E, having parallel arms $a$ extending through orifices in a bottom clamping-plate E' and threaded at their ends to receive retaining-nuts $e$ and provided with two forwardly-projecting parallel flanges or fork-arms $f$ $g$, formed with coinciding orifices $h$. Formed integrally with said clamping-plate is an antirattler-spring F, which projects forwardly and downwardly therefrom and has its free end F' extended back and bearing against the under side of the eye $d$ of the connecting-iron C, as shown. Projecting laterally from the flange or arm $g$ is a cylindrical sleeve I, threaded exteriorly, as at $i$, at its outer end, as shown. This sleeve may be formed integrally with the flange, as illustrated in the present instance, or independently thereof and connected thereto in any suitable manner. A screw-cap $j$ is threaded onto the outer end of the sleeve and is provided with an orifice $k$, alined with the bore of the sleeve and the orifices $h$ in the flanges $f$ $g$. A cross-bolt L slides in the sleeve, and one end $l$ of this bolt is adapted to be inserted through the said orifices $h$ and eye $d$ of the shaft-iron to couple the shaft to the fore axle and to be withdrawn therefrom to release said shaft. Inclosed within the sleeve is a spiral spring $m$, which encompasses said bolt between a head $n$ thereon and the screw-cap $j$ and serves to hold the end $l$ of the bolt projected. The opposite end of the bolt projects through the orifice $k$ in said screw-cap and carries a finger-piece O, whereby it may be readily and conveniently retracted to couple or uncouple a tongue or shaft, as will be readily understood. This construction permits of the shafts being readily and quickly detached when it is desired to substitute a pole or tongue in its place, and vice versa.

Instead of forming the sleeve integrally with the clip, it may be made independent thereof and threaded into or otherwise connected with the arm $g$. By this means the device may be adapted for connection with clips already in use. An important advantage of my construction resides in the fact that the greater portion of the bolt and the spring are inclosed in the sleeve and protected from the weather.

In the embodiment of my invention disclosed in Fig. 5 I provide means for holding the bolt locked against accidental retraction and preventing rattling thereof, and also for holding the bolt retracted while the shaft or tongue is being placed in position for coupling. To this end the arm $f'$ is formed with a cross-groove $p$, intersecting its orifice $h'$, and on its outer side, adjacent to said orifice, with a segment-shaped cam face or boss $p'$, and the arm $g'$ with a cross-groove $q$, having a lateral offset $q'$. The inner end of the bolt L' is provided with a lug $r$, which is adapted to move in said cross-grooves. When the bolt is projected, it may be locked against retraction and held from vibrating by giving it a quarter-turn to cause the lug to bind against said cam-face. When it is desired to hold the bolt retracted to use both hands in placing the shaft-iron in position for coupling, this may be done by drawing back the bolt until the lug $r$ enters the groove $q$ and then giving the bolt a quarter-turn to bring the lug into the offset $q'$. The bolt will then be held retracted against the tension of the spring. When the shaft-iron is in position, the bolt may be released by turning the finger-piece $o'$, whereupon the spring will project the bolt and couple the shaft-iron.

In the embodiment of the invention shown in Figs. 6 and 7 I accomplish the same results by providing the stem of the bolt adjacent to its shoulder with a lug $s$, adapted to traverse a longitudinal groove $s'$ in the sleeve. This groove is formed with oppositely-projecting end offsets $s^2$ $s^3$, which serve the same functions as the cam-boss $p'$ and offset $q'$. (Illustrated in Fig. 5.) In Figs. 8 and 9 this construction is further modified by projecting the groove-offsets in the same direction and securing one end of the spring $m'$ to the lugs $s$ and the other end thereof to a screw $t$, threaded into the cap $j$. The spring is thereby held twisted or under tension and serves the function of automatically turning the bolt and projecting the lug $s$ into the offsets $s^2$ $s^3$.

It will be understood that changes in the form, proportion, and minor details of construction may be resorted to without departing from the spirit or sacrificing any of the advantages of this invention.

Having thus fully described my invention, what I claim as new and useful, and desire to secure by Letters Patent, is—

A shaft and tongue coupling for vehicles, consisting essentially of a clip provided with parallel flanges having alined bolt-holes, an imperforate or non-slotted sleeve projecting laterally from one of said flanges and provided on its interior with a longitudinal groove formed with right-angled offsets which are arranged inside or terminate short of the ends of the sleeve, a cap closing the outer end of the sleeve, a bolt fitted to slide in the sleeve and through an orifice in said cap, and provided at its outer end with a finger-piece, a lug on the inclosed portion of the bolt traversing the groove in said sleeve and adapted to coact with said offsets to hold the bolt locked in retracted or projected position, and a spiral spring inclosing the bolt and secured at one end to the lug and at the other end to the cap, whereby said spring is twisted and normally held under tension and serves by its torsional action the function of automatically turning the bolt and projecting the lug into the groove-offsets, substantially as described.

In testimony whereof I affix my signature in presence of two witnesses.

JOHN M. DAY.

Witnesses:
  G. W. FRIESEN,
  GUS PETERSON.